United States Patent
Yamada et al.

(10) Patent No.: US 9,236,188 B1
(45) Date of Patent: Jan. 12, 2016

(54) MULTILAYER CERAMIC CAPACITOR

(71) Applicant: Murata Manufacturing Co., Ltd., Nagaokakyo-shi, Kyoto-fu (JP)

(72) Inventors: Mayumi Yamada, Nagaokakyo (JP); Atsushi Ishida, Nagaokakyo (JP); Makoto Sugiura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/628,313

(22) Filed: Feb. 23, 2015

(51) Int. Cl.
  H01G 4/30 (2006.01)
  H01G 4/005 (2006.01)
  H01G 4/012 (2006.01)
  H01G 4/232 (2006.01)

(52) U.S. Cl.
  CPC ............... *H01G 4/30* (2013.01); *H01G 4/012* (2013.01); *H01G 4/2325* (2013.01)

(58) Field of Classification Search
  CPC ............................. H01G 4/005; H01G 4/012
  USPC ............................................. 361/301.4, 303
  See application file for complete search history.

(56) References Cited

U.S. PATENT DOCUMENTS

| | | | |
|---|---|---|---|
| 2004/0090721 A1* | 5/2004 | Nagai et al. | 361/15 |
| 2012/0127626 A1* | 5/2012 | Chang et al. | 361/301.4 |
| 2014/0131082 A1* | 5/2014 | Ahn et al. | 174/260 |

FOREIGN PATENT DOCUMENTS

| | | | |
|---|---|---|---|
| JP | 05335175 A | * | 12/1993 |
| JP | 2006-213946 A | | 8/2006 |
| WO | WO 2008088552 A2 | * | 7/2008 |

* cited by examiner

*Primary Examiner* — Eric Thomas
(74) *Attorney, Agent, or Firm* — Keating & Bennett, LLP

(57) ABSTRACT

In a multilayer ceramic capacitor including outer electrodes electrically connected to inner electrodes of a ceramic body, a thickness of each of end portions of extension portions of the inner electrodes in a width direction is larger than a thickness of a corresponding one of middle regions in the width direction, and a distance from a first main surface of the ceramic body to a first auxiliary electrode closest to the first main surface is different from a distance from a second main surface of the ceramic body to a second auxiliary electrode closest to the second main surface in a stacking direction. Each of the first auxiliary electrode and the second auxiliary electrode has a continuity in the width direction of about 60% or more.

5 Claims, 10 Drawing Sheets

MULTILAYER CERAMIC CAPACITOR

BACKGROUND OF THE INVENTION

1. Field of the Invention

The present invention relates to a multilayer ceramic capacitor, and specifically, to a multilayer ceramic capacitor including a structure that includes a ceramic body and outer electrodes, the ceramic body including inner electrodes, and the outer electrodes being electrically connected to the inner electrodes.

2. Description of the Related Art

An example of typical electronic ceramic components is a multilayer ceramic capacitor as disclosed in Japanese Unexamined Patent Application No. 2006-213946.

As illustrated in FIG. 10, the structure of the multilayer ceramic capacitor includes a ceramic multilayer body (ceramic body) 110 and a pair of outer electrodes 104 (104a, 104b) arranged on a pair of end surfaces 103 (103a, 103b), respectively, of the ceramic multilayer body 110, the ceramic multilayer body 110 including a plurality of inner electrodes 102 (102a, 102b) stacked alternately with ceramic layers 101 serving as dielectric layers, and the outer electrodes 104 (104a, 104b) being electrically connected to the inner electrodes 102 (102a, 102b).

The outer electrodes 104 (104a, 104b) include sintered metal layers 105 (105a, 105b) arranged to extend from the end surfaces 103 of the ceramic multilayer body 110 to main surfaces and side surfaces of the ceramic multilayer body 110; and plating layers 106 (106a, 106b) arranged to cover surfaces of the sintered metal layers 105, the sintered metal layers 105 being formed by, for example, baking a conductive paste containing a Cu powder serving as a conductive component.

The plating layers 106 (106a, 106b) include Ni plating layers 107 (107a, 107b) arranged on surfaces of the sintered metal layers 105 (105a, 105b); and Sn plating layers 108 (108a, 108b) arranged on the Ni plating layers 107 (107a, 107b).

The multilayer ceramic capacitor having the foregoing structure has portions where the inner electrodes are not present. The portions are between end portions of the inner electrodes in the width direction, which is a direction perpendicular or substantially perpendicular to both the direction in which the inner electrodes extend and the direction in which the inner electrodes are stacked, and the side surfaces of the ceramic body. In the portions, steps are formed between portions where the inner electrodes are not present and portions where the inner electrodes are present.

The steps cause the positional deviations of the inner electrodes in a stacking step and a pressure-bonding step when the multilayer ceramic capacitor is manufactured.

A multilayer ceramic capacitor is often produced by the steps of stacking mother ceramic green sheets to form a mother multilayer body, the steps of pressure-bonding the resulting mother multilayer body, and the steps of dividing the pressed mother multilayer body into individual elements. In the case of producing a multilayer ceramic capacitor by such a method, if the positional deviation occurs in the stacking step and the pressure-bonding step, the following problems arise: a reduction in the area of an effective region in which adjacent inner electrodes in the stacking direction overlap each other and which contributes to capacitance generation; and the impairment of the mounting stability of the multilayer ceramic capacitor because of a failure to accurately produce a ceramic body having a substantially rectangular parallelepiped shape.

In recent years, a trend toward higher capacitance of multilayer ceramic capacitors has required the stacking of larger number of inner electrodes. The stacking of a large number of inner electrodes may reduce the distance between inner electrodes and surfaces of ceramic bodies, causing a fatal problem of a reduction in moisture resistance reliability.

SUMMARY OF THE INVENTION

To solve the foregoing problems, preferred embodiments of the present invention provide a highly reliable multilayer ceramic capacitor having only a low degree of positional deviation of inner electrodes and satisfactory characteristics, excellent mounting stability and being free of fatal defects, such as reduction in moisture resistance reliability.

According to an aspect of preferred embodiments of the present invention, a multilayer ceramic capacitor includes a ceramic body including inner electrodes and ceramic dielectric layers alternatively stacked on each other in a stacking direction; and a pair of outer electrodes located on predetermined areas of the ceramic body; wherein the ceramic body includes first and second main surfaces opposing each other in the stacking direction, first and second end surfaces opposing each other in a length direction, and first and second side surfaces opposing each other in a width direction; the pair of outer electrodes include a first outer electrode covering at least the first end surface and a second outer electrode covering at least the second end surface; at least one first auxiliary electrode is located between the first main surface and one of the first inner electrodes closest to the first main surface; and at least one second auxiliary electrode is located between the second main surface and one of the second inner electrodes closest to the second main surface; some of the inner electrodes include a first effective portion and a first extension portion extending from the first effective portion toward the first end surface and electrically connecting to the first outer electrode, and others of the inner electrodes include a second effective portion and a second extension portion extending from the second effective portion toward the second end surface and electrically connecting to the second outer electrode; a thickness of each end portion of the first extension portion is larger than a thickness of each middle portion of the first extension portion, and a thickness of each end portion of the second extension portion is larger than a thickness of each middle portion of the second extension portion; a distance from the first main surface to the first auxiliary electrode closest to the first main surface is different from a distance from the second main surface to the second auxiliary electrode closest to the second main surface in the stacking direction.

According to another aspect of preferred embodiments of the present invention, a multilayer ceramic capacitor includes a ceramic body including inner electrodes and ceramic dielectric layers alternatively stacked on each other in a stacking direction; and a pair of outer electrodes located on predetermined areas of the ceramic body; wherein the ceramic body includes first and second main surfaces opposing each other in the stacking direction, first and second end surfaces opposing each other in a length direction, and first and second side surfaces opposing each other in a width direction; the pair of outer electrodes include a first outer electrode covering at least the first end surface and a second outer electrode covering at least the second end surface; at least one first auxiliary electrode having a continuity in the width direction of about 60% or more is located between the first main surface and one of the first inner electrodes closest to the first main surface; at least one second auxiliary electrode having a continuity in the width direction of about 60% or more is located between the second main surface and one of the second inner electrodes closest to the second main surface; some of the inner electrodes include a first effective portion and a first extension portion extending from the first effective portion toward the first end surface and electrically connecting to the first outer electrode, and others of the inner electrodes include a second effective portion and a second extension portion extending from the second effective portion toward the second end surface and electrically connecting to the second outer electrode; a thickness of each end portion of the first extension portion is larger than a thickness of each middle portion of the first extension portion, and a thickness of each end portion of the second extension portion is larger than a thickness of each middle portion of the second extension portion; and a distance from the first main surface to the first auxiliary electrode closest to the first main surface is different from a distance from the second main surface to the first auxiliary electrode closest to the second main surface in the stacking direction; a first boundary layer including Mg and Mn and having a dimension of about 69% or more of a dimension of the first auxiliary electrode in the length direction is located between the first main surface and the first auxiliary electrode; and a second boundary layer including Mg and Mn and having a dimension of about 69% or more of a dimension of the second auxiliary electrode in the length direction is located between the second main surface and the second auxiliary electrode.

Preferably, each molar ratio of a content of Mn to a content of Mg in the first boundary layer and the second boundary layer is in a range of about 0.015 to about 0.6.

Preferably, each of the inner electrodes include an end portion and a middle portion extending in the width direction, and a continuity of each of the end portions of the inner electrodes in the width direction is higher than a continuity of a corresponding one of the middle portion of the inner electrodes in the width direction.

Preferably, a first outermost ceramic dielectric layer of the ceramic dielectric layers includes the first main surface, and a second outermost ceramic dielectric layer of the ceramic dielectric layers includes the second main surface, wherein a thickness of an end portion of the first outermost ceramic dielectric layer facing the end portion of the one of the first inner electrodes closest to the first main surface is smaller than a thickness of a middle portion of the first outermost ceramic dielectric layer facing the middle portion of the one of the first inner electrodes closest to the first main surface; and a thickness of an end portion of the second outermost ceramic dielectric layer facing the end portion of the one of the second inner electrodes closest to the second main surface is smaller than a thickness of a middle portion of the second outermost ceramic dielectric layer facing the middle portion of the one of the second inner electrodes closest to the second main surface.

As a result, in the case of a multilayer ceramic capacitor including inner electrodes in which a thickness of each of the end portions in a width direction is larger than the thickness of a corresponding one of middle regions in the width direction, a degree of positional deviation of the inner electrodes is low in the production process. It is thus possible to provide a highly reliable multilayer ceramic capacitor having satisfactory characteristics and excellent mounting stability and being free of fatal defects, such as exposure of an inner electrode at a side surface of the ceramic body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The features of the present invention will be described in more detail below with reference to preferred embodiments of the present invention.

Figure 1:
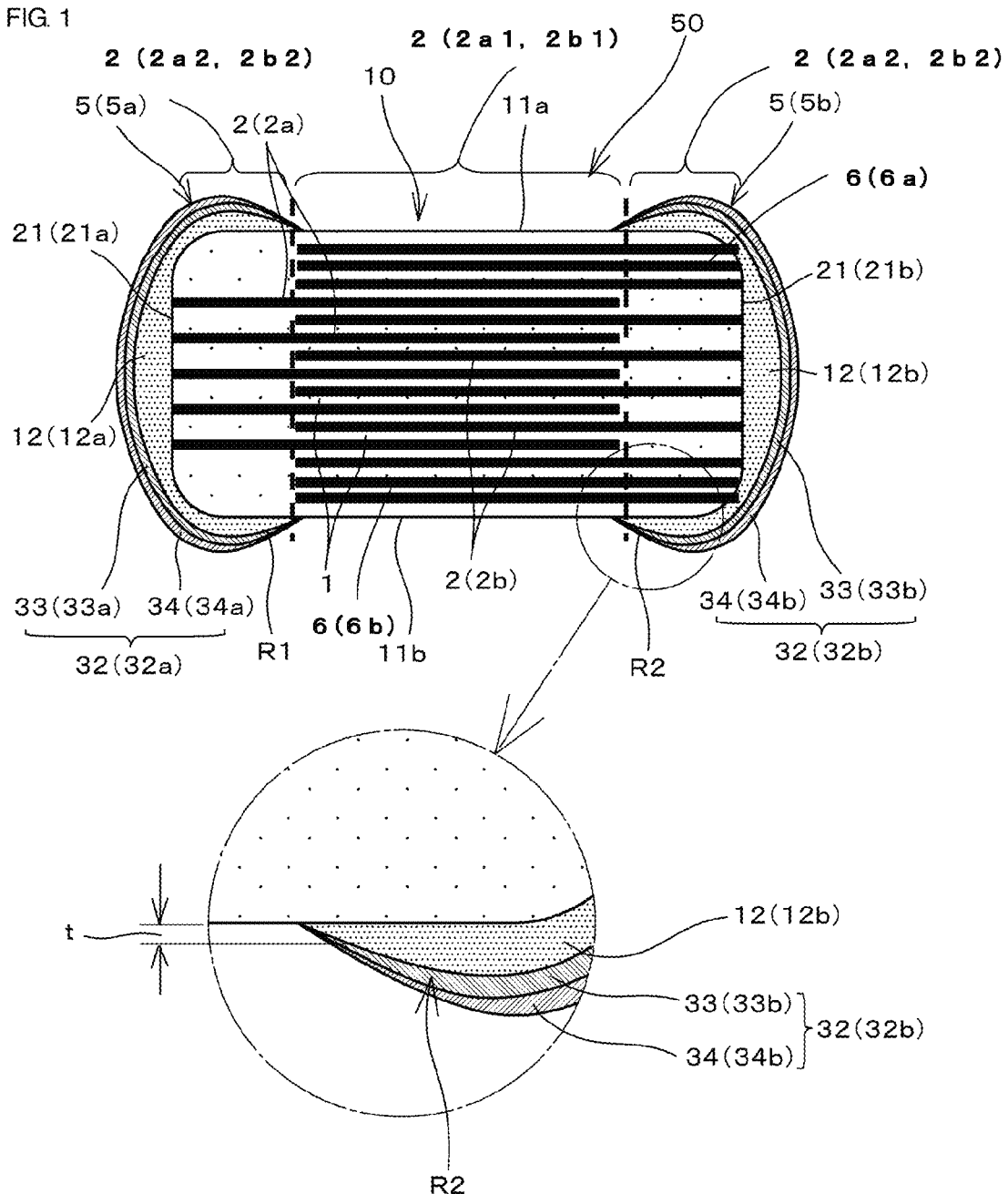
FIG. 1 is a front sectional view of the structure of a multilayer ceramic capacitor according to a preferred embodiment of the present invention.
Figure 2:
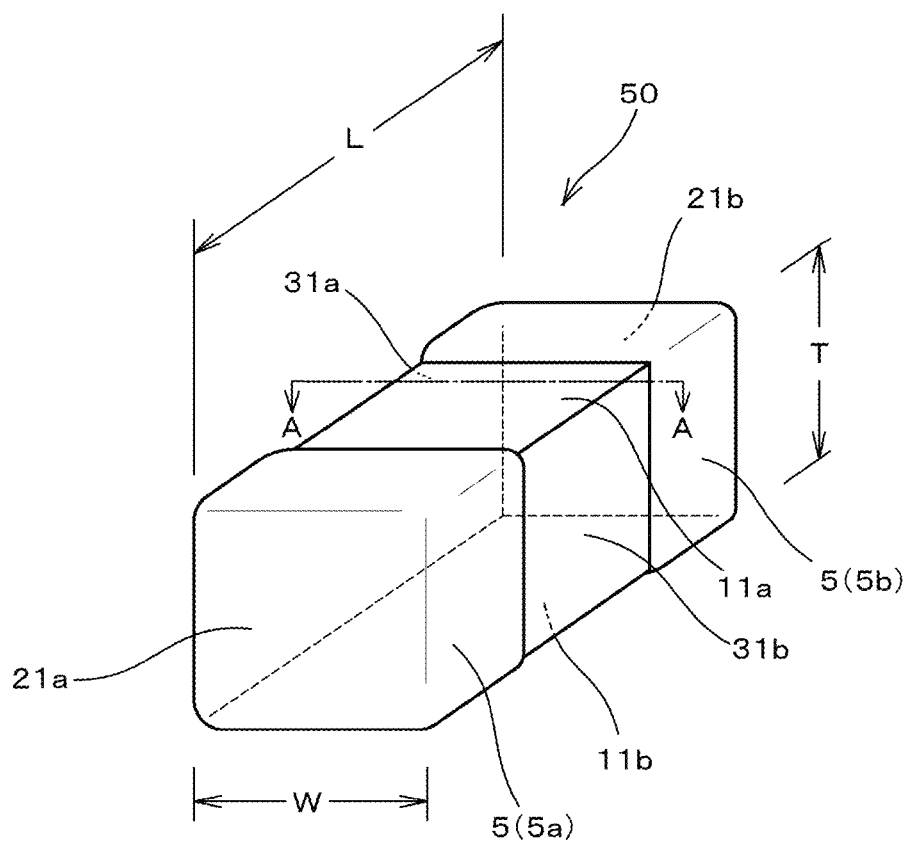
FIG. 2 is a perspective view of an appearance of a multilayer ceramic capacitor according to a preferred embodiment of the present invention.

FIG. 1 is a front sectional view of the structure of a multilayer ceramic capacitor 50 according to a preferred embodiment (first preferred embodiment) of the present invention. FIG. 2 is a perspective view of an appearance of the multilayer ceramic capacitor 50.

As illustrated in FIGS. 1 and 2, the multilayer ceramic capacitor 50 includes a ceramic body 10 and a pair of outer electrodes 5 (5a, 5b) arranged on predetermined areas of external surfaces of the ceramic body 10, the ceramic body 10 including ceramic dielectric layers 1 composed of a dielectric ceramic and a plurality of inner electrodes 2 (2a, 2b) arranged at a plurality of interfaces between the ceramic dielectric layers 1, and the outer electrodes 5 being electrically connected to the inner electrodes 2 (2a, 2b). Each of the inner electrode 2a, 2b includes an effective portion 2a1, 2b1 and an extension portion 2a2, 2b2.

Figure 3:
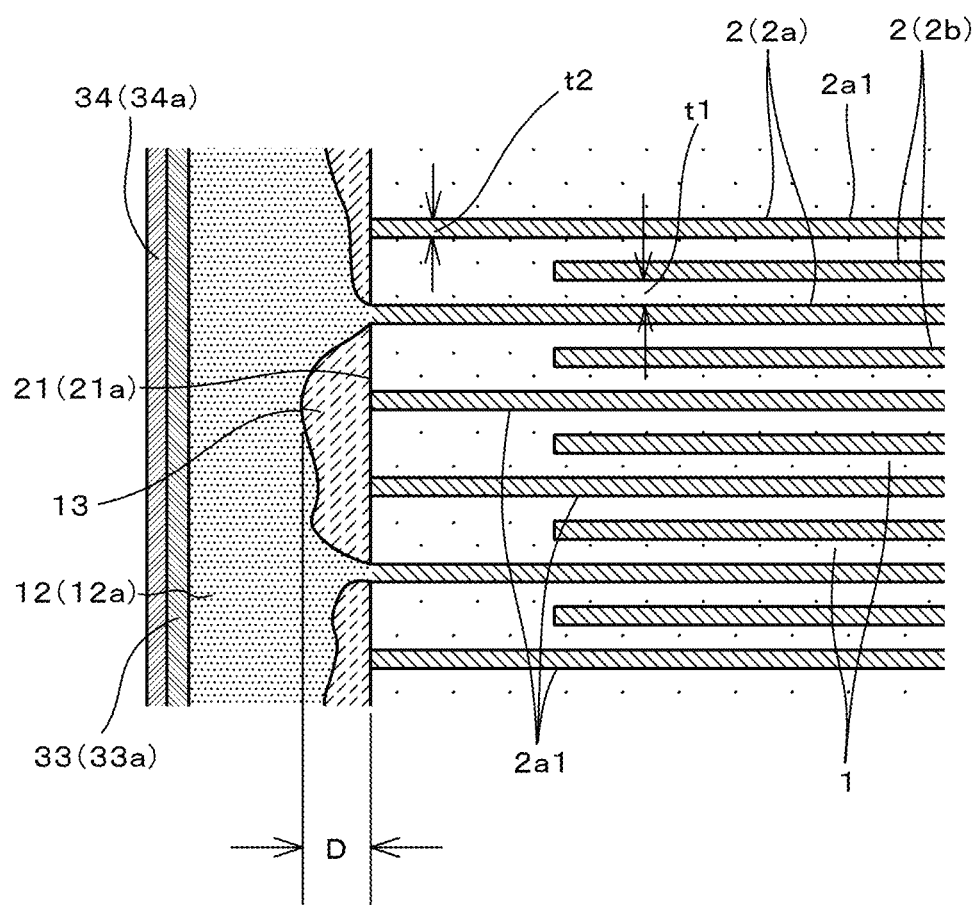
FIG. 3 is an enlarged fragmentary schematic view illustrating the structure of a multilayer ceramic capacitor according to a preferred embodiment of the present invention.

As illustrated in FIG. 3, a connection proportion, which is the proportion of the inner electrodes 2 (2a, 2b) electrically connected to the outer electrodes, preferably is in the range of about 30% to about 70%, for example. Among the inner electrodes 2 (2a, 2b), inner electrodes that are not electrically connected to the outer electrodes are referred to as "unconnected inner electrodes". In the case where a glass component 13 shown in FIG. 3 is present between the unconnected inner electrodes and a corresponding one of the outer electrodes and where a distance between the edge of the end portion of each unconnected inner electrode 2a1 on the side on which the unconnected inner electrode extends to the end surface and an edge of the glass component 13 located farthest from the edge of the end portion of each unconnected inner electrode 2a1 is denoted as D (μm), the following relationship preferably is satisfied:

$$(t1+t2) \times 5 > D > (t1+t2) \times 0.5$$

where t1 represents the dimension (μm) of each of the ceramic dielectric layers 1 in the stacking direction, and t2 represents the dimension (μm) of each of the inner electrodes 2 (2a, 2b) in the stacking direction.

The ceramic dielectric layers 1 included in the ceramic body 10 preferably include a ceramic dielectric composed of a $BaTiO_3$— or $CaZrO_3$-based material. In the case of the $BaTiO_3$-based material, the $BaTiO_3$-based material preferably contains about 1.0 part by mole of Dy and about 1.3 parts by mole of Mg added with respect to about 100 parts by mole of Ti in $BaTiO_3$. The inner electrodes 2 (2a, 2b) are preferably defined by metal layers mainly composed of a base metal, for example, Ni or Cu.

The ceramic body 10 preferably has a rectangular or substantially rectangular parallelepiped shape. The ceramic body 10 includes a first main surface 11a, a second main surface 11b opposite the first main surface 11a, a first end surface 21a perpendicular or substantially perpendicular to the first main surface 11a, a second end surface 21b opposite the first end surface 21a, a first side surface 31a perpendicular or substantially perpendicular to the first end surface 21a, and a second side surface 31b opposite the first side surface 31a.

When a direction in which the first main surface 11a and the second main surface 11b are connected to each other is defined as a stacking direction, the stacking direction indicates the stacking direction of the ceramic dielectric layers 1 and the inner electrodes 2 (2a, 2b).

The inner electrodes 2 (2a, 2b) extend alternately to the first end surface 21a and the second end surface 21b. The inner electrodes 2a extend to the first end surface 21a. The inner electrodes 2b extend to the second end surface 21b.

Each of the inner electrodes 2a includes an effective portion and an extension portion extending from the effective portion toward the first end surface 21a. Each of the inner electrodes 2b includes an effective portion and an extension portion extending from the effective portion toward the second end surface 21b. A distance between the first main surface 11a and the inner electrode closest to the first main surface 11a differs from a distance between the second main surface 11b and the inner electrode closest to the second main surface 11b.

Ceramic dielectric layers in portions located between the edges of the effective portions and the first side surface 31a in the width direction and between the edges of the effective portions and the second side surface 31b in the width direction preferably have a high Si content, compared with ceramic dielectric layers in other portions. The ceramic dielectric layers located in the portions between the edges of the effective portions and the first side surface 31a in the width direction and the ceramic dielectric layers located in the portions between the edges of the effective portions and the second side surface 31b in the width direction preferably have a Si content of about 10% to about 24%, for example. The phrase "a Si content of about 10% to about 24%" indicates that when an exposed surface formed by grinding the ceramic body from the first or second end portion side to the middle portion of the ceramic body in the length direction is analyzed by wavelength dispersive x-ray spectrometry (WDX), the area proportion of a region where Si is detected to the exposed surface preferably is about 10% to about 24%, for example.

Figure 4:
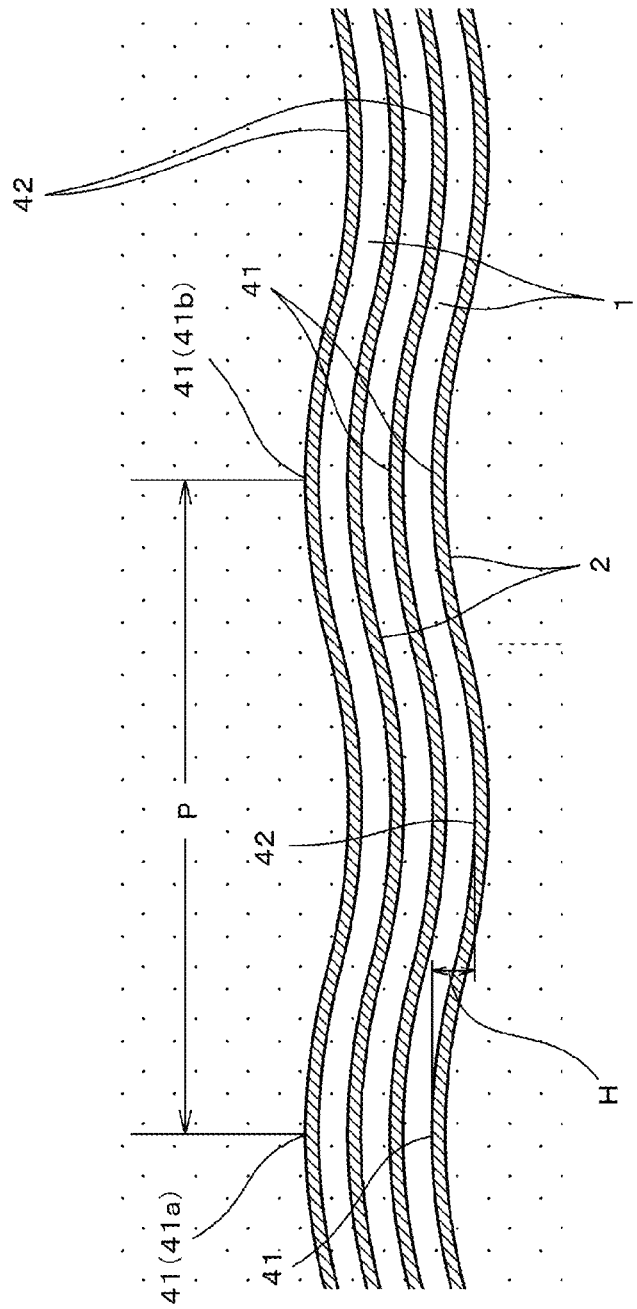
FIG. 4 is an enlarged fragmentary sectional view of the structure of a multilayer ceramic capacitor according to a preferred embodiment of the present invention.

As illustrated in FIG. 4, the inner electrodes 2 preferably are configured to have a curved or wavy state in which peaks 41 and valleys 42 are repeated when viewed from the first or second end surface 21a or 21b and also when viewed from the first or second side surface 31a or 31b. A distance P between one of the peaks 41 (41a) and an adjacent peak 41 (41b) of each inner electrode 2 preferably is in the range of about 100 μm to about 150 μm, for example. Each of the inner electrodes 2 preferably has a thickness of about 0.6 μm to about 0.8 μm, for example. Each of the ceramic dielectric layers 1 preferably has a thickness of about 0.7 μm to about 0.9 μm, for example. The distance H between the top of each of the peaks 41 and the bottom of a corresponding one of the valleys 42 is preferably about 1 μm to about 10 μm, for example.

Figure 5:
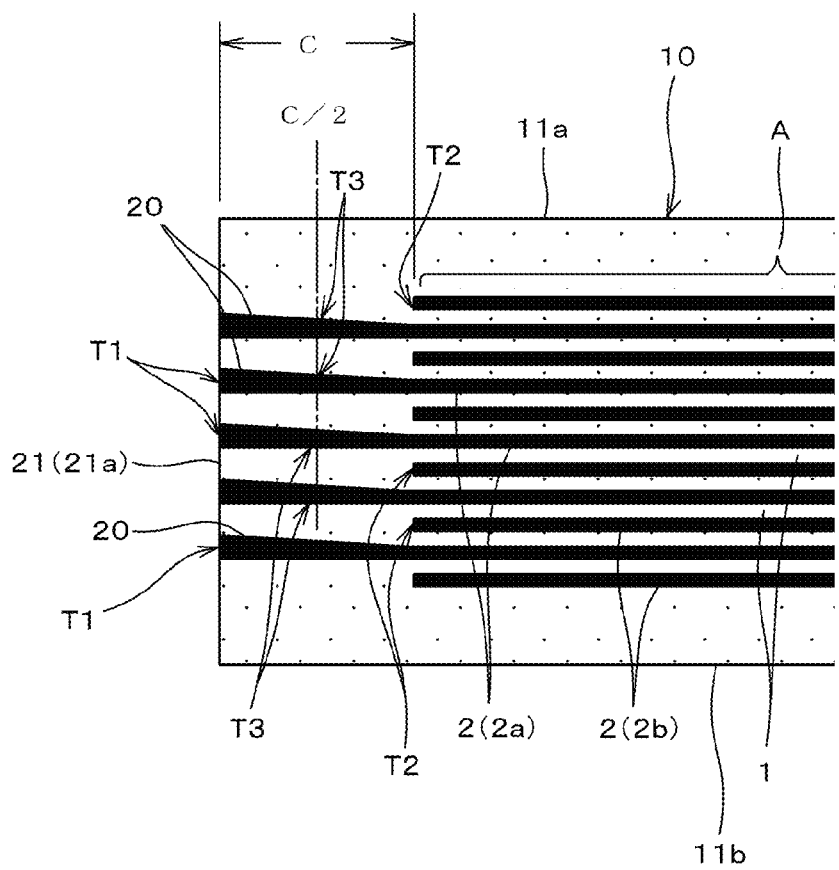
FIG. 5 is an enlarged fragmentary view of a multilayer ceramic capacitor according to a preferred embodiment of the present invention.

As illustrated in FIG. 5, the dimension in the stacking direction, at the first end surface 21a, of an end portion of each of the inner electrodes 2a that extend to the first end surface 21a is denoted as T1. The dimension in the stacking direction of each of the inner electrodes 2b on the side of the first end surface 21a is denoted as T2. The distance in the length direction from the first end surface 21a to the edge of the effective portion of each of the inner electrodes 2b is denoted as C. The dimension in the stacking direction of each of the inner electrodes 2a in a surface located at a position C/2 distant from the first end surface 21a toward the effective portion in the length direction is denoted as T3. The following relationship preferably is satisfied:

$$T2 < T3 < T1.$$

Furthermore, T1, T2, and T3 preferably satisfy the following relationship:

$$0.93 \times (T1+T2)/2 < T3 < 1.07 \times (T1+T2)/2.$$

Note that the foregoing relationships of T1, T2, and T3 are preferably satisfied by the inner electrodes 2a and 2b.

As shown in FIG. 5, the thickness of the extension portion of each of the inner electrodes 2a gradually decreases from an edge at the first main surface 11a to an edge at the effective portion in the length direction. This is also true for the inner electrodes 2a and 2b.

As shown in FIG. 4, in portions extending from the first or second end surfaces 21a and 21b to the effective portion, the inner electrodes 2 (2a, 2b) may be curved or wavy from the first and second main surfaces 11a and 11b sides toward the middle portion in the stacking direction. The degree of curvature is preferably different at the first main surface 11a and the inner electrode 2b.

Figure 6:
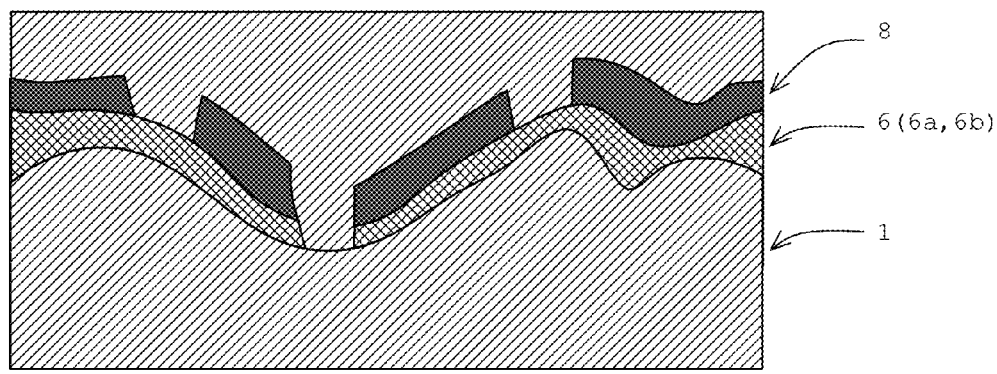
FIG. 6 is an enlarged fragmentary sectional view of the structure of a multilayer ceramic capacitor according to a preferred embodiment of the present invention.

As shown in FIG. 1, an auxiliary electrode 6a is preferably arranged between the first main surface 11a and the inner electrode 2a which is closest to the first main surface 11a. An auxiliary electrode 6b is preferably arranged between the second main surface and the inner electrode 2b which is closest to the second main surface 11b. Between the first main surface 11a and the inner electrode 2a which is closest to the first main surface 11a, or between the second main surface 11b and the inner electrode 2b which is closest to the second main surface 11a, a plurality of respective auxiliary electrodes 6 (6a, 6b) may be provided. The auxiliary electrodes 6 (6a, 6b) may be electrically connected to the outer electrodes having the same potential as the inner electrodes. The auxiliary electrodes 6 (6a, 6b) may not be electrically connected to the outer electrodes 5. As shown in FIG. 6, boundary layers 8 including Mg and Mn are arranged at boundaries of the auxiliary electrodes 6 (6a, 6b) closest to the first and second main surfaces 11a and 11b, namely, the boundary layers 8 are arranged between the auxiliary electrodes 6 (6a, 6b) and the ceramic dielectric layers that define the first and second main surface 11a and 11b. The boundary layers 8 preferably have a dimension of about 69% or more of the dimension of the auxiliary electrodes 6 (6a, 6b) in the length or width direction, for example. Each of the auxiliary electrodes 6 (6a, 6b) preferably has a continuity in the length or width direction of about 60% or more, for example.

Figure 11A:
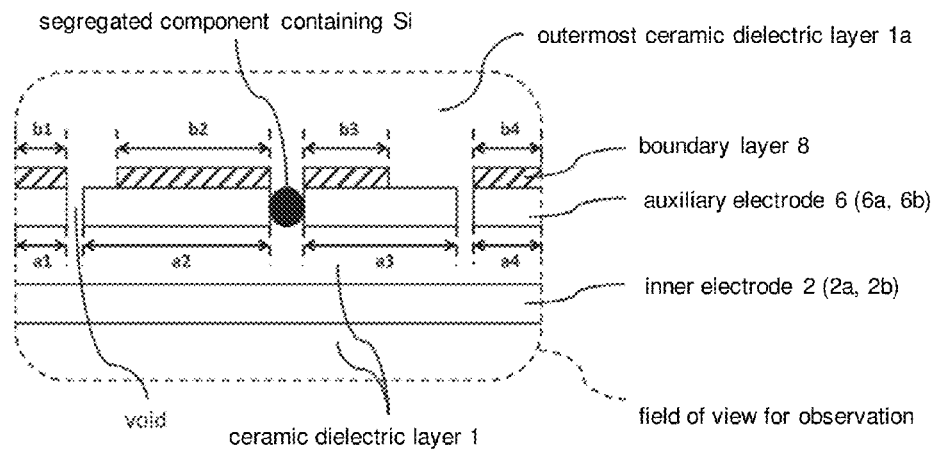
FIGS. 11A and 11B are enlarged fragmentary schematic views illustrating the structure of a multilayer ceramic capacitor according to a preferred embodiment of the present invention in a field of view for observation.

In other words, a proportion in which the boundary layer 8 is denoted as P1, and is obtained by the formula P1=X1/X2× 100, where X1 represents a total of all of the lengths of the discontinuous portions defining the boundary layer and X2 represents a total of all of the lengths of the discontinuous portions defining the auxiliary electrodes 6 (6a, 6b). It should be noted, that X1 and X2 do not include lengths of the voids between the discontinuous portions of the boundary layer and the discontinuous portions of the auxiliary electrodes 6 (6a, 6b). As shown in FIG. 11A, X1=b1+b2+b3+b4 . . . $b_n$ and X2=a1+a2+a3+a4 . . . $a_n$.

The continuity (%) of the auxiliary electrodes 6 (6a, 6b) is calculated from the total length of portions in the length or width direction in which the auxiliary electrode is absent due to a void or voids or other defective portions and the length of the field of view for observation (length of the auxiliary electrode) in the length or width direction, more specifically, continuity of the auxiliary electrode (%)={1−(Total length of portions in which the auxiliary electrode is absent due to a void or other defective portions)/(Length of the auxiliary electrode, i.e., length of the field of view for observation)}× 100.

Figure 11B:
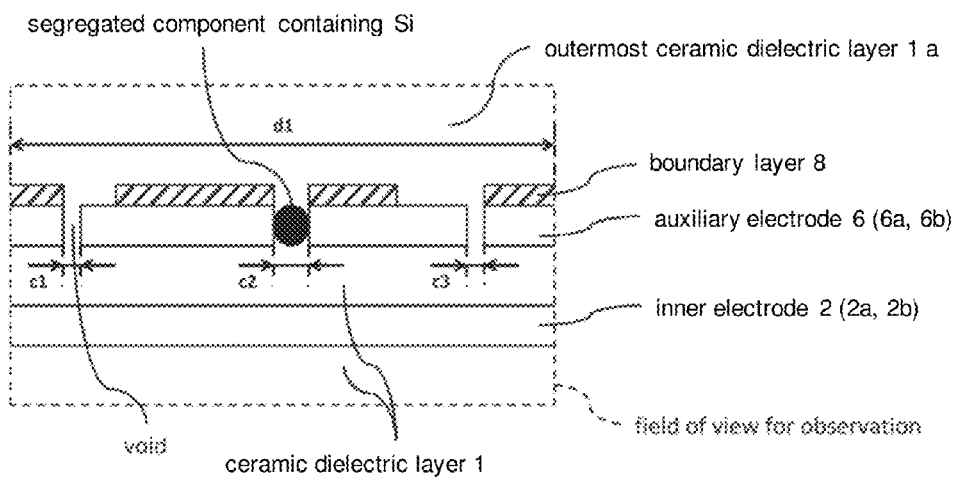

The continuity of the auxiliary electrodes 6 (6a, 6b) is denoted as P2, and is obtained by the formula P2=(1−X3/ X4)×100, where X3 represents a total of the lengths of portions located along the auxiliary electrodes 6 (6a, 6b) in which the auxiliary electrodes 6 (6a, 6b) is absent and located between the discontinuous portions defining the auxiliary electrodes 6 (6a, 6b) (i.e., a total of the lengths of the voids located along the auxiliary electrodes 6 (6a, 6b)) and X4 represents a dimension between left and right end points of the discontinuous portions defining the auxiliary electrodes 6 (6a, 6b), which is also d1. As shown in FIG. 11B, X3=c1+ c2+c3 . . . $c_n$, and X4=d1.

As shown in FIGS. 11A and 11B, a segregated component containing Si preferably is present. The segregated component containing Si more preferably is present in about 39% or more of a defective portion defined as a portion where the continuity is broken. The auxiliary electrodes 6 (6a, 6b) may be arranged only on the side of the first main surface 11a or only on the side of the second main surface 11b. Two or more of the auxiliary electrodes 6 (6a, 6b) may be provided on the side of each of the first and second main surfaces 11a and 11b. The molar ratio, Mn/Mg, of the Mn content to the Mg content in the boundary layers 8 is preferably, but not particularly limited to, in the range of about 0.005 to about 0.7, for example.

The thicknesses of the inner electrodes 2 and the thickness of the ceramic dielectric layers 1 may be determined as described below. The multilayer ceramic capacitor was ground with a grinder in such a manner that a surface defined by the length direction and the stacking direction was exposed. At this time, the grinding was performed to a depth of about ½ of the width of the multilayer ceramic capacitor. Sags of the inner electrodes due to the grinding were removed.

The thicknesses of the inner electrodes 2 in the ground sample were measured. The thicknesses of the inner electrodes 2 were measured as described below. A line substantially perpendicular to the inner electrodes 2 is virtually drawn in the middle portion of the ground end surface of the multilayer ceramic capacitor in the length direction. The sample was divided in the stacking direction into three regions: an upper region, an intermediate region, and a lower region.

In each region, excluding the outermost inner electrodes 2, the dimensions in the stacking direction of randomly selected five samples of the inner electrodes 2 were measured at the points where the samples and the line intersect at right angles. The resulting values of the dimensions were averaged. The thicknesses of the inner electrodes were measured with a scanning electron microscope (SEM). Portions that could not be measured because, for example, the inner electrodes 2 were not present due to a deficit were excluded from the measurement target.

In the upper region, the intermediate region, and the lower region, the dimensions of randomly selected five samples of the ceramic dielectric layers 1 were measured at the points where the samples and the line intersect at right angles. The resulting values of the dimensions were averaged. The dimensions of the ceramic dielectric layers were measured with the scanning electron microscope.

However, the following portions were excluded from the measurement target: the outermost ceramic dielectric layers located outside the outermost inner electrodes 2 in the stacking direction, and portions that could not be measured because, for example, two or more ceramic dielectric layers 1 were connected together at regions where the inner electrodes were not present.

Regions of the boundary layers 8 where the boundary portions of the auxiliary electrodes 6 (6a, 6b) and the line intersect at right angles were observed with an electron microscope at a magnification of about 10,000. In this preferred embodiment, the width of the observation field of view was about 10 μm, and the observation was performed by field emission-wavelength dispersive X-ray spectroscopy (FE-WDX).

In the multilayer ceramic capacitor 50 according to this preferred embodiment, the structure of the outer electrodes 5 (5a, 5b) includes sintered metal layers 12 (12a, 12b) and plating layers 32 (32a, 32b).

The sintered metal layers 12 (12a, 12b) are baked electrodes (thick-film electrodes) formed by applying and baking a conductive paste containing a Cu powder or Ni powder as a conductive component to the ceramic body 10. The components in the sintered metal layers 12 (12a, 12b) are not limited to Cu or Ni. Another metal material may be used.

Each of the sintered metal layers 12 (12a, 12b) may include multiple sintered metal sublayers. The sintered metal sublayers may include different glass components. Each of the sintered metal sublayers may contain voids. In this case, the sintered metal sublayer adjacent to the ceramic body preferably has the lowest number of voids.

Voids may be observed by a method described below. The multilayer ceramic capacitor is ground to a depth of about ½ of the width or thickness thereof so as to expose a section of each outer electrode. Sags due to the grinding are removed. In the section of the outer electrode, an image including a sintered metal portion and the other portion is captured by SEM. The section is subjected to composition analysis by WDX.

Glass component-containing portions are identified by image processing. The image captured by SEM is superimposed on the image processed by WDX to distinguish the glass component-containing portions from the void portions. Similarly, in the case of different glass components, identification is performed by compositional analysis using WDX.

The sintered metal layers 12 (12a, 12b) extend from the first and second end surfaces 21a and 21b of the ceramic body 10 to the first and second main surfaces 11a and 11b and the first and second side surfaces 31a and 31b of the ceramic body 10. Preferably, each of the sintered metal layers 12 usually has a thickness of about 0.5 μm to about 10 μm, for example. However, the thickness of each sintered metal layer 12 is not limited to the above range. Each of the sintered metal layers 12 may have a different thickness.

The plating layers 32 (32a, 32b) are arranged so as to cover the entire sintered metal layers 12 (12a, 12b).

In this preferred embodiment, the plating layers 32 (32a, 32b) preferably have a two-layer structure including Ni plating layers 33 (33a, 33b) arranged on the sintered metal layers 12 (12a, 12b) and Sn plating layers 34 (34a, 34b) arranged on the Ni plating layers 33 (33a, 33b).

Figure 7:
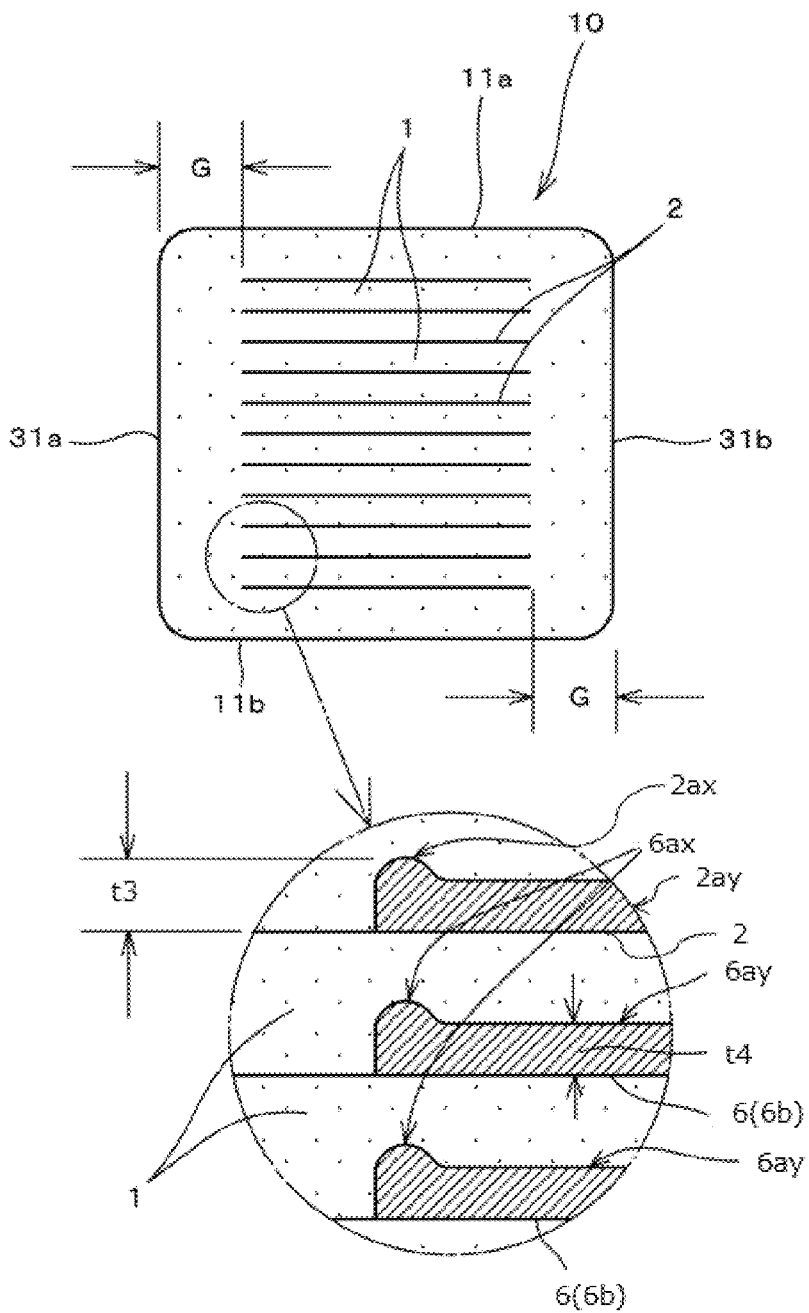
FIG. 7 illustrates the structure of a multilayer ceramic capacitor according to a preferred embodiment of the present invention and is a cross-sectional view taken along line A-A of FIG. 2.

In the multilayer ceramic capacitor according to this preferred embodiment, as schematically illustrated in FIG. 7, the dimension t3 in the stacking direction of each of end portions 2ax and 6ax of the inner electrodes 2 and the auxiliary electrodes 6 in the width direction is larger than the dimension t4 in the stacking direction of a corresponding one of middle portions 2ay and 6ay of the inner electrodes 2 and the auxiliary electrode 6. In the multilayer ceramic capacitor according to this preferred embodiment, both end portions of the inner electrodes 2a and 2b in the width direction preferably have the same structure or substantially the same structure.

The dimension t3 in the stacking direction of each of the end portions 2ax of the inner electrodes 2 in the width direction is preferably larger than the dimension t4 in the stacking direction of each of the middle portions 2ay in the width direction by about 1% or more of the dimension t4 of portions 2ay, for example. In other words, it is preferable that (t3/t4≥about 1.01) is satisfied, for example.

When t3/t4 is lower than about 1.01, the effect of suppressing the positional deviation of the inner electrodes 2 may be insufficient, which is not preferred.

The dimension t3 of each of the end portions 2ax of the inner electrodes 2 is preferably about 0.77 μm or more, for example. When the dimension t3 of each of the end portions 2ax of the inner electrodes 2 is less than about 0.77 μm, the positional deviation at the time of stacking may occur, which is not preferred.

The dimension in the stacking direction of each of the inner electrodes 2 may be measured as described below. For example, the ceramic body 10 is ground from the side of the first end surface 21a or the second end surface 21b such that a surface defined by the width direction and the stacking direction of the ceramic body 10 is a surface where the inner electrodes 2 are exposed. The inner electrodes 2 that have been exposed at the section are observed.

As described above, the dimension t3 of each of the end portions 2ax is larger than the dimension t4 of each of the middle portions 2ay. This configuration significantly reduces or prevents positional deviation in the production process by the fact that, for example, when ceramic green sheets including inner electrode patterns are stacked, the inner electrode patterns having been formed by applying a conductive paste to ceramic green sheets such that end portions of inner electrodes in the width direction have an increased thickness, the thick end portions of the inner electrodes (paste patterns) in the width direction are engaged in an adjacent ceramic green sheet.

It is thus possible to provide the highly reliable multilayer ceramic capacitor free from positional deviations of the inner electrodes.

In the multilayer ceramic capacitor according to preferred embodiments of the present invention, in the case where the dimension in the stacking direction of an end portion of each of the inner electrodes opposite the end portions of the inner electrodes extending to the end surfaces of the ceramic body is increased, compared with the thickness of the middle portions of each of the inner electrodes, in addition to the increase in the thickness of the end portions of each of the inner electrodes in the width direction, it is possible to further assuredly significantly reduce or prevent positional deviations of the inner electrodes.

In the multilayer ceramic capacitor according to this preferred embodiment, the continuity of each of the end portions 2ax of the inner electrodes 2 in the width direction preferably is higher than the continuity of a corresponding one of the middle portions 2ay of the inner electrodes 2 in the width direction. The continuity (%) of each of the end portions 2ax is calculated from the total length of portions in the width direction in which each of the end portions 2ax is absent due to a void or voids or other defective portions and the distance from the edge to the other edge of the each of the end portions 2ax, more specifically, continuity of the end portions (%)={1−(Total length of portions in which the each of the end portions 2ax is absent due to a void or other defective portions)/(Length of the distance from the edge to the other edge of the each of the end portions 2ax)}×100, for example. The continuity (%) of each of the middle portions 2ay is calculated from the total length of portions in the width direction in which each of the middle portions 2ay is absent due to a void or voids or other defective portions and the distance from the edge to the other edge of the each of the middle portions 2ay, more specifically, continuity of the middle portions (%)={1−(Total length of portions in which the each of the middle portions 2ay is absent due to a void or other defective portions)/(Length of the distance from the edge to the other edge of the each of the middle portions 2ay)}×100, for example. The continuity of the end portions 2ax and the middle portions 2ay is obtained preferably by using the same method described above used to determine the continuity of the auxiliary electrodes 6 (6a, 6b).

Preferably, the continuity of each of the end portions 2ax of the inner electrodes 2 in the width direction is higher than the continuity of a corresponding one of the middle portions 2ay in the width direction and about 80% or more, for example.

In this structure, it is possible to reduce the stress concentration due to the piezoelectric phenomenon of the ceramic material in the vicinities of the end portions of the inner electrodes 2 in the width direction to significantly reduce or prevent the occurrence of cracks.

Figure 8:
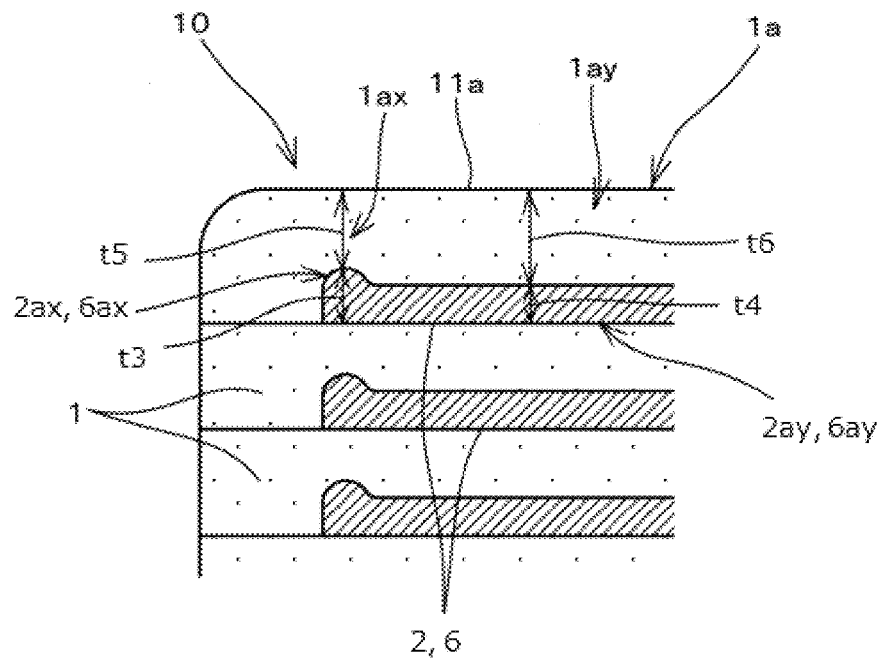
FIG. 8 illustrates the structure of a multilayer ceramic capacitor according to a preferred embodiment of the present invention and is a side sectional view of a ceramic body.

In the multilayer ceramic capacitor according to this preferred embodiment as illustrated in FIG. 8, the outermost ceramic dielectric layers 1a are located outside the outermost inner electrodes 2 of the plurality of inner electrodes 2, and the dimension t5 in the stacking direction of an end portion 1ax of each of the outermost ceramic dielectric layers 1a facing the end portions 2ax and 6ax of the inner electrodes 2 and the auxiliary electrodes 6 is smaller than the dimension t6 in the stacking direction of a middle portion 1ay of each of the outermost ceramic dielectric layers 1a facing the middle portions 2ay and 6ay of the inner electrodes 2 and the auxiliary electrodes 6. The structure including the outermost ceramic dielectric layers 1a provides effects as described below.

Figure 9:
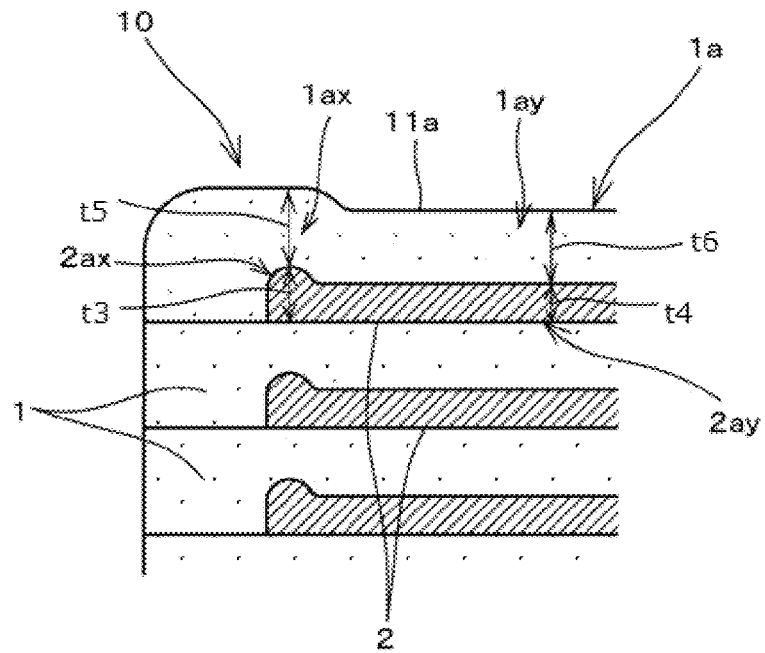
FIG. 9 illustrates the structure of a multilayer ceramic capacitor according to a preferred embodiment of the present invention and is a side sectional view of a multilayer body of a ceramic body excluding the outermost dielectric layer.
Figure 10:
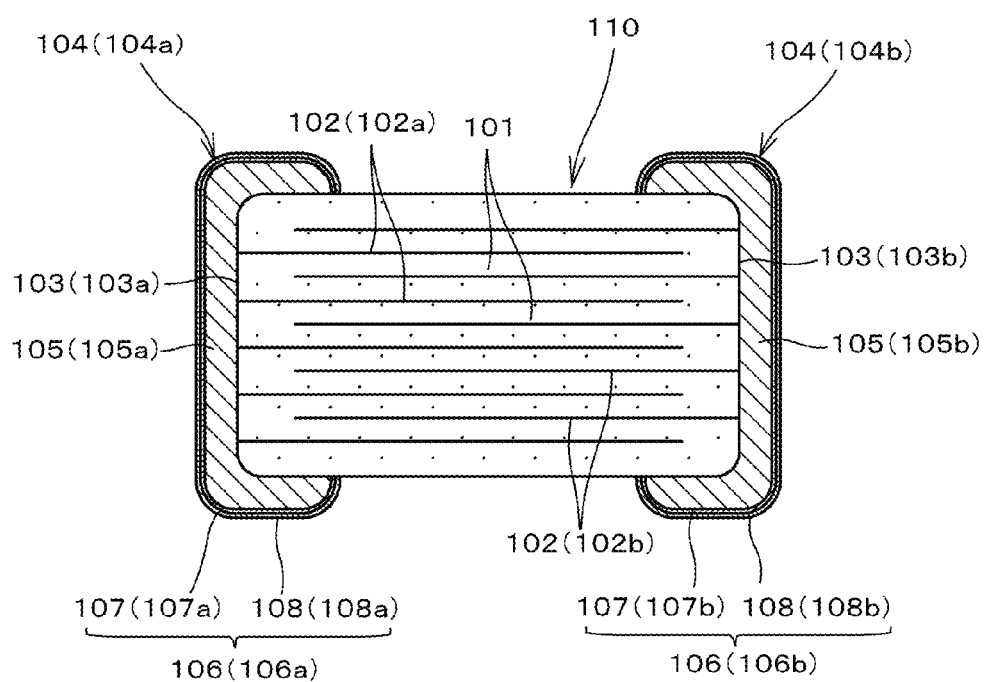
FIG. 10 is a front sectional view of the structure of outer electrodes of a multilayer ceramic capacitor in the related art.

For example, in the case where each of the outermost ceramic dielectric layers 1a has a uniform dimension as illustrated in FIG. 9 (i.e., t5=t6), since the dimension t3 of each of the end portions 2ax of the inner electrodes 2 is larger than the dimension t4 of each of the middle portions 2ay, the dimension in the stacking direction of each of the end portions of the ceramic body 10 corresponding to the end portions 2ax of the inner electrodes 2 is larger, and the dimension in the stacking direction of the middle portion of the ceramic body 10 corresponding to the middle portions 2ay of the inner electrodes 2 is smaller. That is, middle portions in the length direction of both of the upper and lower main surfaces of the ceramic body 10 are recessed. However, as illustrated in FIG. 8, the dimension t6 of the middle portion 1ay of each of the outermost ceramic dielectric layers 1a is larger than the dimension t5 of each of the end portions 1ax. Therefore, as illustrated in FIG. 8, it is possible to provide the ceramic body 10 with main surfaces 11a and 11b (see FIG. 1) that have excellent flatness. This excellent flatness of the main surfaces 11a and 11b can be formed by pressing so that the dielectric material of the outermost ceramic dielectric layers flows.

For example, when mounting is performed on a printed circuit board, the first and second main surfaces 11a and 11b of the ceramic body 10 define mounting surfaces facing the board. For example, a crack formed at a corner portion, at which cracking is liable to occur, of the ceramic body 10 propagates to the middle portion of the main surface 11a or 11b. However, it is possible to prevent the reaching and propagation of the crack because of the thick outermost ceramic dielectric layers 1a.

Accordingly, the foregoing structure provides the highly reliable multilayer ceramic capacitor having no or only a low degree of the positional deviation of inner electrodes, satisfactory characteristics, and excellent mounting stability, and being free of fatal defects, such as reduction in moisture resistance reliability.

In this preferred embodiment, the following multilayer ceramic capacitors were produced as the multilayer ceramic capacitor 50 according to the following non-limiting example:

(a) a multilayer ceramic capacitor having a length (L) of about 1.0 mm, a width (W) of about 0.5 mm, and a thickness (T) of about 0.5 mm, the dimensions including outer electrodes;

(b) a multilayer ceramic capacitor having a length (L) of about 0.6 mm, a width (W) of about 0.3 mm, and a thickness (T) of about 0.3 mm, the dimensions including outer electrodes; and (c) a multilayer ceramic capacitor having a length (L) of about 0.4 mm, a width (W) of about 0.2 mm, and a thickness (T) of about 0.2 mm, the dimensions including outer electrodes.

The present invention is not limited to the multilayer ceramic capacitors having the foregoing dimensions and may be applied to multilayer ceramic capacitor having different dimensions.

A non-limiting example of a method for producing the multilayer ceramic capacitor 50 will be described below.

A binder and a solvent are mixed with a dielectric ceramic powder containing $BaTiO_3$ or $CaZrO_3$ serving as a main component to prepare a ceramic raw material slurry. The ceramic raw material slurry is formed into a sheet shape by applying a thin layer of the ceramic raw material slurry to a resin film, such as a polyethylene terephthalate (PET) film, thus forming ceramic green sheets.

A conductive paste is applied to the ceramic green sheets by a method, for example, screen printing or gravure printing, to form inner electrode patterns.

In this case, for example, the formation of the inner electrode patterns is performed by gravure printing or screen printing. In the case where the inner electrode patterns are formed by gravure printing, the depth of a gravure printing plate having patterns corresponding to the inner electrode patterns is increased in regions corresponding to the end portions of each of the inner electrodes in the width direction, thus increasing the thickness of the end portions of each of the inner electrode patterns in the width direction.

In the case of screen printing, an increase in the mesh of a screen printing plate in regions corresponding to the end portions of each of the inner electrodes in the width direction results in an increase in the thickness of the end portions of each of the inner electrode patterns in the width direction.

Predetermined numbers of the ceramic green sheets on which the inner electrode patterns have been formed and the ceramic green sheets on which no inner electrode patterns are formed (the ceramic green sheets are to be formed into the outermost ceramic dielectric layers) are stacked in a predetermined number.

As described above, the thickness of the end portions of the inner electrodes in the width direction is increased, so that the thick end portions in the width direction are first subjected to pressure and compression at the time of stacking. Thus, the phenomena, such as the positional deviation of the inner electrodes and collapse at the time of stacking, are not likely to occur, which results in accurate stacking.

The resulting stacked block is pressed to press-bond the ceramic green sheets. The pressing of the stacked block is performed as described below. The stacked block is interposed between resin films and pressed by a method, such as isostatic pressing.

The ceramic green sheets to be formed into the outermost ceramic dielectric layers flow and deform in this pressing step into a shape such that the thicknesses of regions of the ceramic green sheets facing the end portions of the inner electrode patterns in the width direction are smaller than those of regions of the ceramic green sheets facing the middle regions of the inner electrode patterns in the width direction.

The pressed stack is divided by a method, for example, force-cutting or cutting, into rectangular or substantially rectangular chips (pieces). The resulting chips are subjected to barrel polishing.

The chips (pieces to be formed into the ceramic bodies 10 (FIG. 1) after firing) that have been subjected to barrel polishing are heated to a predetermined temperature to remove the binder and then fired at, for example, about 900° C. to about 1000° C., thus providing rectangular or substantially rectangular ceramic bodies.

A portion of each ceramic body on the side of one end surface is held. A conductive paste containing a Cu powder or Ni powder serving as a conductive component is applied to a surface plate to form a conductive paste layer. The conductive paste is applied to the other end surface of the ceramic body by dipping the other end surface of the ceramic body in the conductive paste layer, and is then dried.

The conductive paste is applied to one end surface in the same way as described above and then dried.

The resulting conductive paste on one end and the other end of the ceramic body is baked to form the sintered metal layers.

Ni plating and Sn plating are performed, in that order, on the sintered metal layers to form the Ni plating layer and the Sn plating layer.

As a result, the multilayer ceramic capacitor 50 according to one of the preferred embodiments of the present invention is provided, the multilayer ceramic capacitor 50 having the structure as illustrated in FIGS. 1 and 2.

To ascertain the effects according to preferred embodiments of the present invention, with respect to the multilayer ceramic capacitors which were produced as described above and which had a length (L) of about 0.6 mm, a width (W) of about 0.3 mm, and a thickness (T) of about 0.3 mm (the dimensions including the outer electrodes), for example, the following respects were checked as described below.

(a) The dimension t3 in the stacking direction of each of the end portions of the inner electrodes in the width direction, and the ratio (t3/t4) of the dimension t3 in the stacking direction of each of the end portions of the inner electrodes in the width direction to the dimension t4 in the stacking direction of each of the middle portions of the inner electrodes in the width direction;

(b) the continuity, which is defined as {1−(Total length of portions in the width direction in which the inner electrode is absent due to a void or other defective portions)/(Length of the inner electrode in the width direction, i.e., length of the field of view for observation)}×100;

(c) the positional deviation of the inner electrodes (positional deviation of the inner electrodes at the time of stacking); and (d) the presence or absence of the formation of a crack based on the piezoelectric phenomenon.

Table 1 describes the results.

larger than the dimension t4 in the stacking direction of the middle portions in the width direction, no deviation of the inner electrodes occurred.

In each of the samples in which the continuity of each of the end portions of the inner electrodes in the width direction was higher than at the continuity of a corresponding one of the middle portions in the width direction, no cracks based on the piezoelectric phenomenon were formed.

It is confirmed that, although not described in Table 1, when the dimension t1 in the stacking direction of the end portions of the inner electrodes in the width direction is smaller than the thickness t2 of the middle portions in the width direction, the positional deviation occurs.

It is confirmed that in a sample in which the continuity of each of the end portions of the inner electrodes in the width direction is lower than at the continuity of a corresponding one of the middle portions in the width direction, the effect of suppressing or preventing the formation of a crack based on the piezoelectric phenomenon is reduced.

The present invention is not limited to the foregoing preferred embodiments. Various applications and modifications may be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

TABLE 1

| Sample | Dimension t3 of end portion of inner electrode in length direction [μm] | Continuity of end portion of inner electrode in width direction [%] | t3/t4 | Positional deviation of inner electrode | Presence or absence of crack |
| --- | --- | --- | --- | --- | --- |
| 1 | 0.77 | 82 | 1.016 | good | absent (good) |
| 2 | 0.80 | 90 | 1.021 | good | absent (good |
| 3 | 0.82 | 95 | 1.0256 | good | absent (good |

It is confirmed that in each of samples 1 to 3 described in Table 1, the continuity of each of the end portions of the inner electrodes in the width direction is higher than the continuity of a corresponding one of the middle portions in the width direction.

Regarding the positional deviation of the inner electrodes, when a distance G from the first and second side surfaces 31a and 31b of the ceramic body 10 to the end portions of the inner electrodes in the width direction in FIG. 7 is more than about 20 μm, it is believed that no positional deviation occurs. In this case, the positional deviation is rated as "good" in Table 1.

Regarding the formation of a crack based on the piezoelectric phenomenon, when no crack is formed at the end portions of the ceramic body in the width direction at the time of the application of a voltage (64 V) to the sample, it is believed that no crack due to the piezoelectric phenomenon is formed. In this case, the presence or absence of crack based on the piezoelectric phenomenon is rated as "absence (good)" in Table 1.

Table 1 demonstrated satisfactory results in which in each of the samples that satisfied the requirement of preferred embodiments of the present invention, i.e., satisfied the fact that the dimension t3 in the stacking direction of the end portions of the inner electrodes in the width direction was

What is claimed is:

1. A multilayer ceramic capacitor comprising:
a ceramic body including inner electrodes and ceramic dielectric layers alternatively stacked on each other in a stacking direction; and
a pair of outer electrodes located on predetermined areas of the ceramic body; wherein
the ceramic body includes first and second main surfaces opposing each other in the stacking direction, first and second end surfaces opposing each other in a length direction, and first and second side surfaces opposing each other in a width direction;
the pair of outer electrodes include a first outer electrode covering at least the first end surface and a second outer electrode covering at least the second end surface;
at least one first auxiliary electrode is located between the first main surface and one of the inner electrodes closest to the first main surface; and
at least one second auxiliary electrode is located between the second main surface and one of the inner electrodes closest to the second main surface;
some of the inner electrodes include a first effective portion and a first extension portion extending from the first effective portion toward the first end surface and electrically connecting to the first outer electrode, and others of the inner electrodes include a second effective portion and a second extension portion extending from the second effective portion toward the second end surface and electrically connecting to the second outer electrode;
a thickness of each end portion of the first extension portion is larger than a thickness of each middle portion of the first extension portion, and a thickness of each end portion of the second extension portion is larger than a thickness of each middle portion of the second extension portion;
a distance from the first main surface to the first auxiliary electrode closest to the first main surface is different from a distance from the second main surface to the second auxiliary electrode closest to the second main surface in the stacking direction;
a dimension in the stacking direction of each of end portions of the first auxiliary electrode in a width direction of the first auxiliary electrode is larger than a dimension in the stacking direction of a middle portion of the first auxiliary electrode in the width direction of the first auxiliary electrode by about 1% or more of the dimension in the stacking direction of the middle portion of the first auxiliary electrode in the width direction of the first auxiliary electrode; and
a dimension in the stacking direction of each of end portions of the second auxiliary electrode in a width direction of the second auxiliary electrode is larger than a dimension in the stacking direction of a middle portion of the second auxiliary electrode in the width direction of the second auxiliary electrode by about 1% or more of the dimension in the stacking direction of the middle portion of the second auxiliary electrode in the width direction of the second auxiliary electrode.

2. A multilayer ceramic capacitor comprising:
a ceramic body including inner electrodes and ceramic dielectric layers alternatively stacked on each other in a stacking direction; and
a pair of outer electrodes located on predetermined areas of the ceramic body; wherein
the ceramic body includes first and second main surfaces opposing each other in the stacking direction, first and second end surfaces opposing each other in a length direction, and first and second side surfaces opposing each other in a width direction;
the pair of outer electrodes include a first outer electrode covering at least the first end surface and a second outer electrode covering at least the second end surface;
at least one first auxiliary electrode having a continuity in the width direction of about 60% or more is located between the first main surface and one of the inner electrodes closest to the first main surface;
at least one second auxiliary electrode having a continuity in the width direction of about 60% or more is located between the second main surface and one of the inner electrodes closest to the second main surface;
some of the inner electrodes include a first effective portion and a first extension portion extending from the first effective portion toward the first end surface and electrically connecting to the first outer electrode, and others of the inner electrodes include a second effective portion and a second extension portion extending from the second effective portion toward the second end surface and electrically connecting to the second outer electrode;
a thickness of each end portion of the first extension portion is larger than a thickness of each middle portion of the first extension portion, and a thickness of each end portion of the second extension portion is larger than a thickness of each middle portion of the second extension portion; and a distance from the first main surface to the first auxiliary electrode closest to the first main surface is different from a distance from the second main surface to the first auxiliary electrode closest to the second main surface in the stacking direction;
a first boundary layer including Mg and Mn and having a dimension of about 69% or more of a dimension of the first auxiliary electrode in the length direction is located between the first main surface and the first auxiliary electrode;
a second boundary layer including Mg and Mn and having a dimension of about 69% or more of a dimension of the second auxiliary electrode in the length direction is located between the second main surface and the second auxiliary electrode;
a dimension in the stacking direction of each of end portions of the first auxiliary electrode in a width direction of the first auxiliary electrode is larger than a dimension in the stacking direction of a middle portion of the first auxiliary electrode in the width direction of the first auxiliary electrode by about 1% or more of the dimension in the stacking direction of the middle portion of the first auxiliary electrode in the width direction of the first auxiliary electrode; and
a dimension in the stacking direction of each of end portions of the second auxiliary electrode in a width direction of the second auxiliary electrode is larger than a dimension in the stacking direction of a middle portion of the second auxiliary electrode in the width direction of the second auxiliary electrode by about 1% or more of the dimension in the stacking direction of the middle portion of the second auxiliary electrode in the width direction of the second auxiliary electrode.

3. The multilayer ceramic capacitor according to claim 2, wherein each molar ratio of a content of Mn to a content of Mg in the first boundary layer and the second boundary layer is in a range of about 0.015 to about 0.6.

4. The multilayer ceramic capacitor according to claim 3, wherein
each of the inner electrodes include an end portion and a middle portion extending in the width direction;
a continuity of each of the end portions of the inner electrodes in the width direction is higher than a continuity of a corresponding one of the middle portion of the inner electrodes in the width direction.

5. The multilayer ceramic capacitor according to claim 4, wherein
a first outermost ceramic dielectric layer of the ceramic dielectric layers includes the first main surface;
a second outermost ceramic dielectric layer of the ceramic dielectric layers includes the second main surface; wherein
a thickness of an end portion of the first outermost ceramic dielectric layer facing the end portion of the one of the inner electrodes closest to the first main surface is smaller than a thickness of a middle portion of the first outermost ceramic dielectric layer facing the middle portion of the one of the inner electrodes closest to the first main surface; and
a thickness of an end portion of the second outermost ceramic dielectric layer facing the end portion of the one of the inner electrodes closest to the second main surface is smaller than a thickness of a middle portion of the second outermost ceramic dielectric layer facing the middle portion of the one of the inner electrodes closest to the second main surface.

* * * * *